(12) United States Patent
Kobernat (10) Patent No.: US 6,647,275 B1
(45) Date of Patent: Nov. 11, 2003

(54) METHOD OF AND SYSTEM FOR DUAL-TECHNOLOGY TRAFFIC PROVISIONING IN A WIRELESS SYSTEM

(75) Inventor: Kris A. Kobernat, Allen, TX (US)

(73) Assignee: Nortel Networks Limited, St. Laurent (CA)

( * ) Notice: Subject to any disclaimer, the term of this patent is extended or adjusted under 35 U.S.C. 154(b) by 543 days.

(21) Appl. No.: 09/596,776

(22) Filed: Jun. 19, 2000

Related U.S. Application Data
(60) Provisional application No. 60/157,947, filed on Oct. 6, 1999.

(51) Int. Cl.[7] .................................................. H04B 1/38
(52) U.S. Cl. ........................ 455/553; 455/453; 455/452
(58) Field of Search ................................ 455/553, 453, 455/446, 452, 422, 1, 403, 435.2, 464, 450, 515, 436, 550, 516, 575, 62, 455, 423–425, 63, 67.1; 370/60; 379/59

(56) References Cited

U.S. PATENT DOCUMENTS

| | | | | |
|---|---|---|---|---|
| 5,206,856 A | * | 4/1993 | Chung | 370/60 |
| 5,343,513 A | * | 8/1994 | Kay et al. | 379/59 |
| 5,542,093 A | * | 7/1996 | Bodin et al. | 455/33.2 |
| 5,649,293 A | * | 7/1997 | Reed | 455/453 |
| 6,131,012 A | * | 10/2000 | Struhsaker et al. | 455/5.1 |
| 6,195,327 B1 | * | 2/2001 | Lysejko et al. | 370/201 |
| 6,223,041 B1 | * | 4/2001 | Egner et al. | 455/452 |
| 6,246,880 B1 | * | 6/2001 | Lizuka | 455/446 |

* cited by examiner

Primary Examiner—Edward F. Urban
Assistant Examiner—C. Chow
(74) Attorney, Agent, or Firm—John D. Crane; Bracewell & Patterson, L.L.P.

(57) ABSTRACT

A method of and system for provisioning analog voice channels and digital voice channels in a in dual-technology wireless system that includes both singlemode and dualmode mobile wireless units determines the number of analog voice channels necessary to produce a desired singlemode grade of service, taking into account overflow of dualmode calls to analog channels, the number of digital voice channels necessary to produce a desired dualmode grade of service, taking into account the overflow of the dualmode calls to the analog channels. The method may be used to provision channels or to form provisioning tables to enable the determination the number of analog voice channels and digital voice channels necessary to produce said desired singlemode and dualmode grades of service for various levels of singlemode and dualmode traffic demand.

15 Claims, 4 Drawing Sheets

| | 0.0 | 0.5 | 1.0 | 1.5 | 2.0 | 2.5 | 3.0 | 3.5 |
|---|---|---|---|---|---|---|---|---|
| 0.0 | 0 0 | 1 0 | 2 0 | 2 0 | 2 0 | 3 0 | 3 0 | 3 0 |
| 0.5 | 0 3 | 1 3 | 1 3 | 2 3 | 2 3 | 2 3 | 3 3 | 3 3 |
| 1.0 | 0 4 | 1 4 | 2 4 | 2 4 | 2 4 | 3 4 | 3 4 | 3 4 |
| 1.5 | 0 5 | 1 5 | 2 5 | 2 5 | 2 5 | 3 5 | 3 5 | 3 5 |
| 2.0 | 0 6 | 1 6 | 1 6 | 2 6 | 2 6 | 2 6 | 2 6 | 3 6 |
| 2.5 | 0 7 | 1 7 | 1 7 | 1 7 | 2 7 | 2 7 | 2 7 | 3 7 |
| 3.0 | 0 8 | 1 8 | 1 8 | 1 8 | 2 8 | 2 8 | 2 8 | 2 8 |
| 3.5 | 0 9 | 1 9 | 1 9 | 1 9 | 1 9 | 2 9 | 2 9 | 2 9 |

Fig. 3

METHOD OF AND SYSTEM FOR DUAL-TECHNOLOGY TRAFFIC PROVISIONING IN A WIRELESS SYSTEM

CROSS-REFERENCE TO RELATED APPLICATION

The present application claims the benefit of U.S. Provisional Application Serial No. 60/157,947, filed Oct. 6, 1999, titled METHOD OF AND SYSTEM FOR DUAL-TECHNOLOGY TRAFFIC PROVISIONING IN A WIRELESS SYSTEM.

FIELD OF THE INVENTION

The present invention relates generally to the field of telecommunication system provisioning, and more particularly to a method of and system for provisioning resources in a system where there is overflow from one type of resource into another.

DESCRIPTION OF THE PRIOR ART

Most North American wireless telecommunication systems are built upon an infrastructure that includes both analog technology, such as Advanced Mobile Phone Service (AMPS), and digital technology, such as Time Division Multiple Access (TDMA) or Code Division Multiple Access (CDMA). In AMPS technology, each call is carried on a single frequency. In TDMA or CDMA technology, multiple calls are time division multiplexed (TDMA) or code division multiplexed (TDMA) on a single frequency. The multiplexing of several calls on the same frequency provides greater capacity requiring less bandwidth. Partially as a result of the greater capacity provided by newer technologies, wireless operators have been migrating their systems from less efficient technologies to more efficient technologies. In order to balance cost versus quality, wireless operators attempt to provision the minimum number of resources or frequencies necessary to meet specific Grade of Service (GOS) objectives.

Provisioning is typically done according to a mathematical modeling technique. Currently used models include the Poisson Traffic Model and the Erlang B Traffic Model. The Poisson Traffic Model uses the Poisson equation to determine the probability P(i) of a specific number i of simultaneous calls. According to the Poisson Traffic Model $$P(i) = e^{-A} \frac{A^i}{i!}$$

Where A is the number of Erlangs and i is the number of simultaneous calls.

Since blocking occurs when all channels are occupied, the Grade of Service, also termed blocking rate, is given by the probability that there are N or more simultaneous calls, where N is the number of channels. Also, since the sum of the probabilities of all possible discrete events must be one, the probability of N or more simultaneous calls $P(\geq N)$ is equal to the complementary probability that there are less than N simultaneous calls $P(<N)$, i.e., $P(\geq N)=1-P(<N)$ The Poisson Traffic Model determines the grade of service (GOS) by subtracting the sum of the probabilities of events 0 to N−1 from 1 to determine the probability of N or more simultaneous calls. Thus, $$P(\geq N) = 1 - e^{-A} \sum_{i=0}^{N-1} \frac{A^i}{i!}$$

Where A is the number of Erlangs, i is the number of simultaneous calls, and

N is the number of voice channels.

Currently, wireless system operators provision analog and digital technologies as separate singlemode entities, i.e. they provision analog resources based solely upon analog-only demand, and they provision digital resources based solely upon digital demand. However, most digital capable wireless units are dualmode and capable of operating in either digital mode or analog mode. Thus, if there are insufficient digital channels, a dualmode phone overflows to the analog system. Because of this overflow, wireless operators are finding that the radios they have been provisioning may be inadequate to meet singlemode grade of service objectives. Additionally, the number of digital radios may be excessive to meet their digital grade service objectives. Inadequate analog provisioning leads to subscriber dissatisfaction. Excessive digital provisioning leads to unnecessary cost.

SUMMARY OF THE INVENTION

The present invention provides a method of and system for provisioning analog voice channels and digital voice channels in a dual-technology wireless system that includes both singlemode (for example analog-only) and dualmode (analog and digital capable) wireless units. The method determines the number of analog voice channels necessary to produce a desired singlemode grade of service, taking into account overflow of dualmode calls to analog channels, and the number of digital voice channels necessary to produce a desired dualmode grade of service, taking into account the overflow of the dualmode calls to the analog channels. The method may be used to provision channels or to form provisioning tables to enable the determination of the number of analog voice channels and digital voice channels necessary to produce a desired singlemode grade of service for various levels of singlemode and dualmode traffic demand. Preferably, the method of the present invention is based upon an improved Poisson traffic model in which the desired singlemode grade of service is defined by SinglemodeGOS, which is defined by the equation:

$$SinglemodeGOS = \left(1 - e^{-E_a} \sum_{i=0}^{A-1} \frac{E_a^i}{i!}\right) + \sum_{j=0}^{A-1}\left(1 - e^{-E_d} \sum_{h=0}^{T+A-j-1} \frac{E_d^h}{h!}\right)\left(e^{-E_a} \frac{E_a^j}{j!}\right)$$

where $E_a$ is the number of Singlemode Erlangs, $E_d$ is the number of Dualmode Erlangs, T is the number of digital voice channels, and A is the number of analog voice channels.

Similarly, dualmode Grade of Service is defined by DualmodeGOS, which is determined by the equation:

$$DualmodeGOS = $$

$$\left(1 - e^{-E_d} \sum_{i=0}^{T-1} \frac{E_d^i}{i!}\right) + \sum_{j=0}^{A-1} \left(1 - e^{-E_a} \sum_{h=0}^{j} \frac{E_a^h}{h!}\right) \left(e^{-E_d} \frac{E_a^{(T+A-j-1)}}{(T+A-j-1)!}\right)$$

where $E_a$ is the number of Singlemode Erlangs,
$E_d$ is the number of Dualmode Erlangs,
T is the number of digital voice channels, and
A is the number of analog voice channels.

The present invention provides an iterative method of provisioning an optimal number of analog voice channels and digital voice channels in a dual-technology wireless system. It calculates singlemode grade of service as a function of a selected number A of analog voice channels and a selected number T of digital voice channels. If the calculated singlemode grade of service is greater than a specified singlemode grade of service criteria, the method calculates the singlemode grade of service as a function of A+x and T, and as a function of A and T+y, where x is 1 and y is 3 for AMPS/TDMA3 systems. The method then lets A equal A+x if the singlemode grade of service as a function of A+x and T is less than the singlemode grade of service as a function of A and T+y. The method lets T equal T+y if the singlemode grade of service as a function of A and T+y is less than the singlemode grade of service as a function of A+x and T. Then, the method again calculates the singlemode grade of service as a function of A and T.

The method continues until the singlemode grade of service is less than the specified singlemode grade of service criteria, whereupon the method calculates the dualmode grade of service as function of A and T. If the dualmode Grade of Service is more than the specified dualmode GOS criteria, it lets T equal T+y. It then calculates the singlemode GOS as a function of A−x and T. If the singlemode GOS as a function of A−x and T is less than the singlemode GOS criteria it lets A equal A−x. The method repeats until the dualmode grade of service as a function of A and T is less than the specified dualmode grade of service criteria.

Next, the method calculates the average grade of service as a function of A and T, and as a function of A+x and T−y. The average grade of service is calculated according to the equation:

$$\frac{(DualmodeTraffic)(DualmodeGOS) + (SingleTraffic)(SinglemodeGOS)}{(DualmodeTraffic + SinglemodeTraffic)}.$$

If the average grade of service as a function of A+x and T−y is less than the average grade of service as a function of A and T, and the singlemode and dualmode grades of service as a function of A+x and T−y is less than both the singlemode and dualmode specified grade of service criteria, the method sets A=A+x and T=T−y. Finally, the method calculates the average grade of service as a function of A and T, and as a function of A−x and T+y. If the average grade of service as a function of A−x and T+y is less than the average grade of service as a function of A and T, and the singlemode and dualmode grades of service as a function of A−x and T+y is less than both the singlemode and dualmode specified grade of service criteria, the method sets A=A−x and T=T+y. The method provisions T digital voice channels and A analog voice channels.

DESCRIPTION OF THE PREFERRED EMBODIMENT

Figure 1:
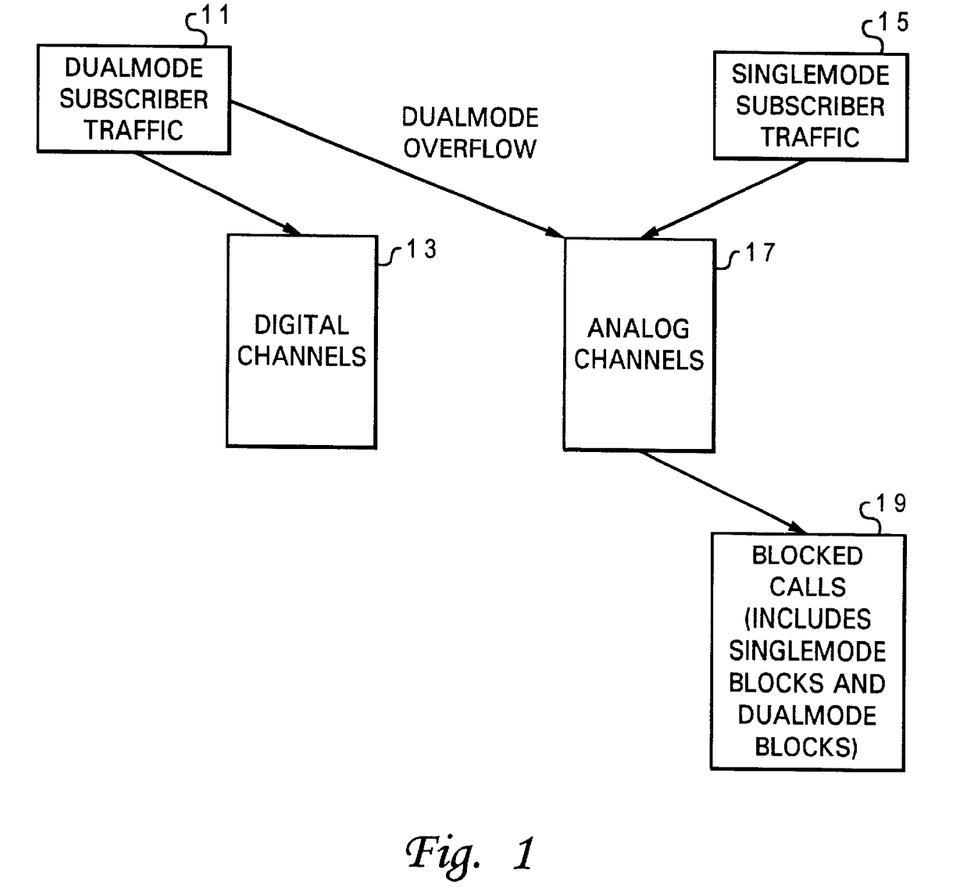
FIG. 1 is block diagram illustrating the operation of a dual-technology wireless system.

Referring now to the drawings, and first to FIG. 1 the concept of dualmode overflow is illustrated. Dualmode subscriber traffic 11 is normally carried on digital channels 13. Singlemode subscriber traffic 15 is carried on analog channels 17. When the digital traffic is greater than the number of digital channels dualmode phones enter analog mode and their traffic overflows to the analog channels. When the analog traffic is greater than the number of analog channels, analog calls are blocked, as indicated at 19. When the combined analog and digital traffic exceeds the total number of analog and digital channels, both singlemode and dualmode calls may be blocked. For example, if there are seven AMPS radios (seven Analog Voice Channels (AVCH)) and three TDMA3 radios (nine Digital Voice Channels (DVCH)), analog radios block when there are seven simultaneous analog callers. However, the analog radios also block when there are six singlemode, analog-only, callers and ten or more dualmode callers. The analog radios also block when there are five singlemode callers and eleven or more dualmode callers, four singlemode callers and twelve or more dualmode callers, etc.

The present invention takes into account the effects of dualmode overflow in provisioning both the analog and digital channels by providing an improvement to the Poisson Traffic Model. Without regard to dualmode in a system with A analog voice channels (AVCH), singlemode grade of service is defined, according to the Poisson Traffic Model, by the equation $$P = 1 - e^{-E_a} \sum_{i=0}^{A-1} \frac{E_a^i}{i!}$$

where A is the number of analog voice channels, and
$E_a$ is the number of singlemode Erlangs.
The individual probabilities for a discrete number j of singlemode simultaneous calls is $$e^{-E_a} \sum_{j=0}^{A-1} \frac{E_a^j}{j!}.$$

If there are T digital voice channels (DVCH), a dualmode call will overflow from a DVCH to an AVCH if there are greater than T simultaneous digital calls. If there are A AMPS voice channels, an incoming AMPS call will be blocked if there are simultaneously j AMPS voice calls and T+A−j dualmode voice calls. The probability that there will be up to T+A−j simultaneous dualmode calls is given by the equation:

$$P(A, T, j) = e^{-E_d} \sum_{h=0}^{T+A-j-1} \frac{E_d^h}{h!}$$

Multiplying the analog individual probabilities by the probability that there is sufficient dualmode overflow to induce analog blocking gives the equation:

$$P(A, T) = \sum_{j=0}^{A-1}\left(1-e^{-E_d}\sum_{h=0}^{T+A-j-1}\frac{E_d^h}{h!}\right)\left(e^{-E_a}\frac{E_a^j}{j!}\right)$$

Thus, the grade of service (GOS) offered to singlemode subscribers is expressed as follows:

$SinglemodeGOS =$ $$\left(1-e^{-E_a}\sum_{i=0}^{A-1}\frac{E_a^i}{i!}\right)+\sum_{j=0}^{A-1}\left(1-e^{-E_d}\sum_{h=0}^{T+A-j-1}\frac{E_d^h}{h!}\right)\left(e^{-E_a}\frac{E_a^j}{j!}\right)$$

Where $E_a$ is the number of Singlemode Erlangs, $E_d$ is the number of dualmode Erlangs, T is the number of digital voice channels, and A is the number of analog voice channels.

Using the same methodology for deriving the singlemode GOS, an equation for Dualmode GOS is derived as follow:

$DualmodeGOS =$ $$\left(1-e^{-E_d}\sum_{i=0}^{T-1}\frac{E_d^i}{i!}\right)+\sum_{j=0}^{A-1}\left(1-e^{-E_a}\sum_{h=0}^{j}\frac{E_a^h}{h!}\right)\left(e^{-E_d}\frac{E_a^{(T+A-j-1)}}{(T+A-j-1)!}\right)$$

Again, where $E_a$ is the number of Singlemode Erlangs, $E_d$ is the number of dualmode Erlangs, T is the number of digital voice channels, and A is the number of analog voice channels.

In order to provide an overall system grade of service, the present invention defines an average grade of service. Average GOS can be calculated using the following equation:

$$\frac{(DualmodeTraffic)(DualmodeGOS)+(SinglemodeTraffic)(SinglemodeGOS)}{(DualmodeTraffic+SinglemodeTraffic)}$$

Figure 2A:
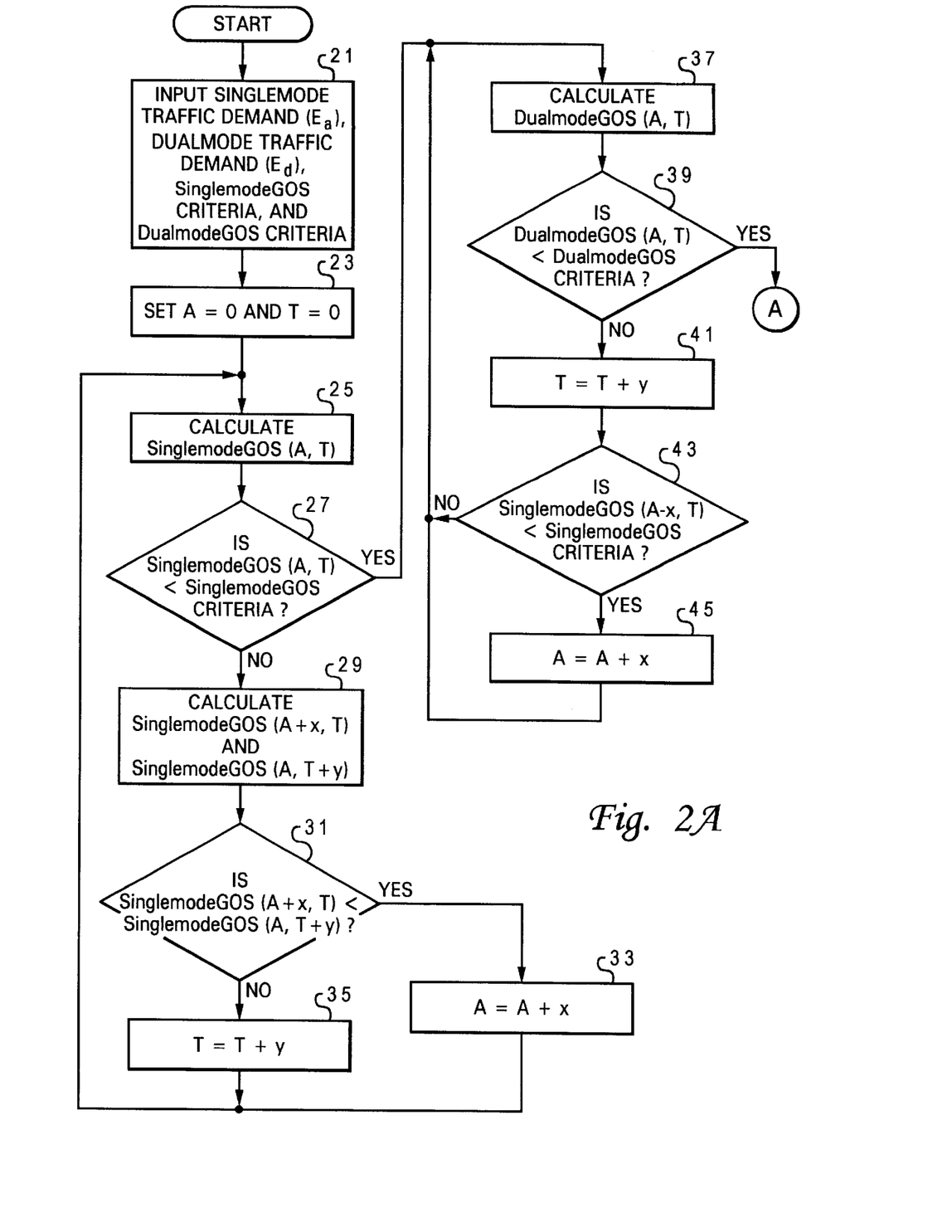
FIGS. 2A and 2B comprise a flowchart of the method of the present invention.
Figure 2B:
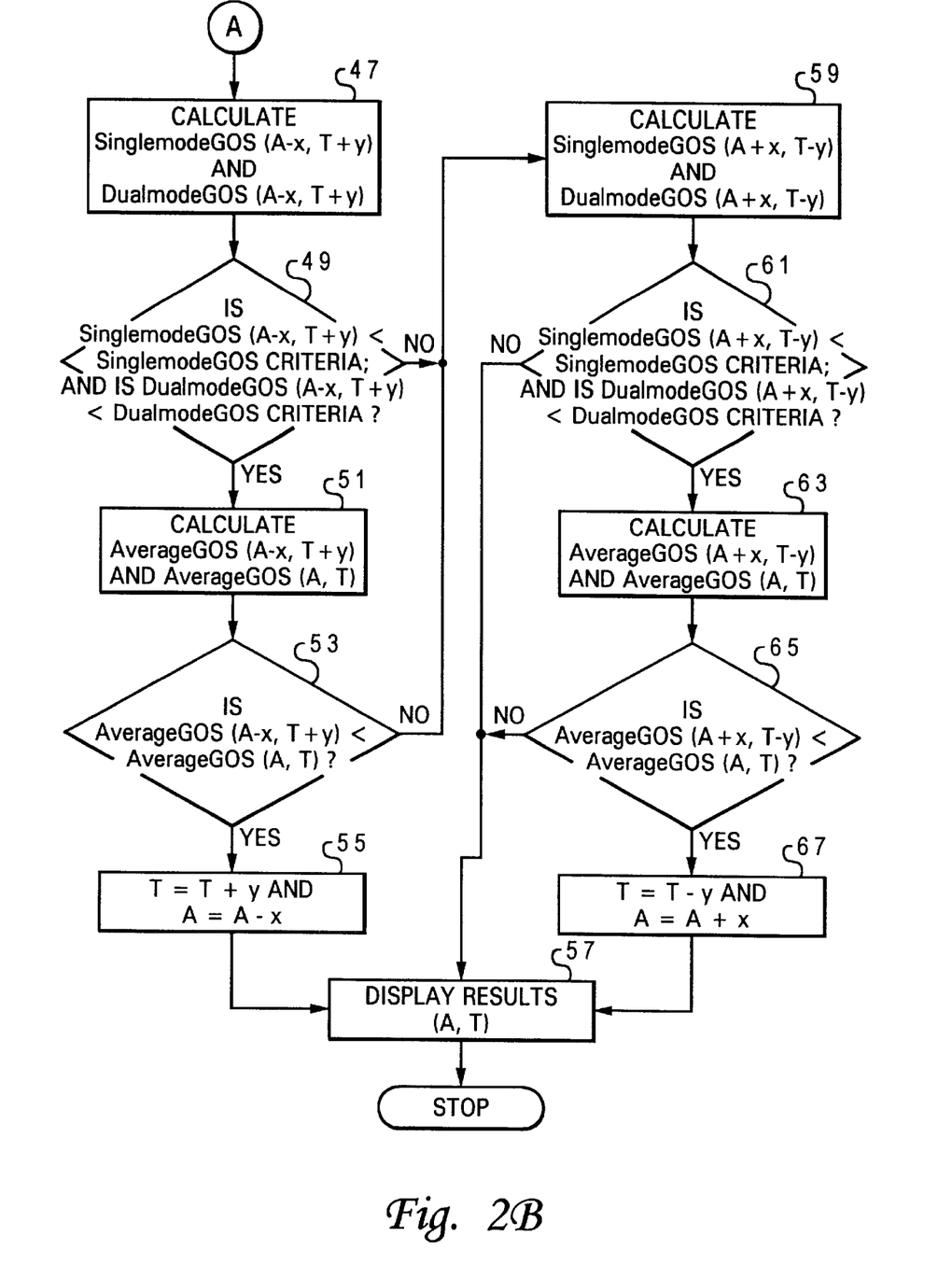

Referring now to FIGS. 2A and 2B, there is shown a flowchart of a method of optimizing the provisioning of analog and digital voice channels according to the present invention. The singlemode traffic demand, dualmode traffic demand, and specified singlemode and dualmode grade of service (GOS) criteria are input at block 21. The number of analog voice channels A and digital voice channels T are initially set to zero, at block 23. Then, singlemode grade of service SinglemodeGOS is calculated in the manner set forth above, at block 25. The method then tests, at decision block 27, if SinglemodeGOS is less than the specified Singlemode GOS Criteria. If not, the method calculates singlemode GOS as a function of A+x and T, and singlemode GOS as a function of A and T+y, at block 29, where x is one and y is three (for AMPS/TDMA3 dualmode systems). If, it decision block 31, singlemode GOS as a function of A+x and T is less than singlemode GOS as a function of A and T+y, A is set to equal A+x, at block 33, and processing returns to block 25. If, at decision block 31, singlemode GOS as a function of A+x and T is not less than singlemode GOS as a function of A and T+y, T is set to equal T+y, at block 35, and processing returns to block 25.

T and A are incremented in the foregoing manner until SinglemodeGOS is less than the specified singlemode GOS Criteria, as determined at decision block 27. Then, the method calculates the dualmode grade of service DualmodeGOS, in the manner set forth above, as function of A and T, at block 37. Then, the method tests, at decision block 39, if the dualmode GOS as a function of A and T is less than the dualmode GOS criteria. If not, the method lets T equal T plus y, at block 41. Then, the method tests, at decision block 43, if the singlemode GOS as a function of T and A minus x is less the singlemode GOS criteria. If so, the method sets A equal to A plus x, at block 45, and processing returns to block 37. If, at decision block 43, the singlemode GOS as a function of T and A minus x is not less than the singlemode GOS criteria, then processing returns to block 37.

FIG. 2A processing continues until, as determined at decision block 39, the dualmode GOS as a function of A and T is less than the dualmode GOS criteria. Then, processing continues at block 47 of FIG. 2B, where the method calculates the singlemode GOS and dualmode GOS, both as functions of A minus x and T plus y. Then, the method tests, at decision block 49, if the singlemode GOS, as a function of A minus x and T plus y, AND the dualmode GOS, as a function of A minus x and T plus y, are less than the singlemode GOS criteria and the dualmode GOS criteria, respectively. If so, the method calculates, at block 51, the average grade of service as a function of A and T, and as a function of A−x and T+y. It will be recalled average grade of service is calculated according to the equation:

$$\frac{(DualmodeTraffic)(DualmodeGOS)+(SinglemodeTraffic)(SinglemodeGOS)}{(DualmodeTraffic+SinglemodeTraffic)}.$$

If, at decision block 53, the average grade of service as a function of A−x and T+y is less than the average grade of service as a function of A and T, the method sets T=T+y and A=A−x, at block 55, and displays the results at block 57. If, at decision block 53, the average grade of service as a function of A−x and T+y is not less than the average grade of service as a function of A and T, the method calculates the singlemode GOS and dualmode GOS, both as functions of A+x and T−y, at block 59. Then, the method tests, at decision block 61, if the singlemode GOS, as a function of A plus x and T minus y, AND the dualmode GOS, as a function of A plus x and T minus y, are less than the singlemode GOS criteria and the dualmode GOS criteria, respectively. If not, the method displays the results A and T, at block 57, and processing ends. If so, the method calculates, at block 63, the average grade of service as a function of A and T, and as a function of A+x and T−y. Then, the method tests, at decision block 65, if the average grade of service as a function of A+x and T−y is less than the average grade of service as a function of A and T. If not, the method displays the results A and T, at block 57, and processing ends. If, as determined at decision block 65, the average grade of service as a function of A+x and T−y is less than the average grade of service as a function of A and T, the method sets T equal to T minus y and A equal to A plus x, at block 67, and displays the results, at block 57. A wireless operator may thus provision T digital voice channels and A analog voice channels. Digital voice channels are provisioned by TDMA radios, each having y channels.

Figure 3:
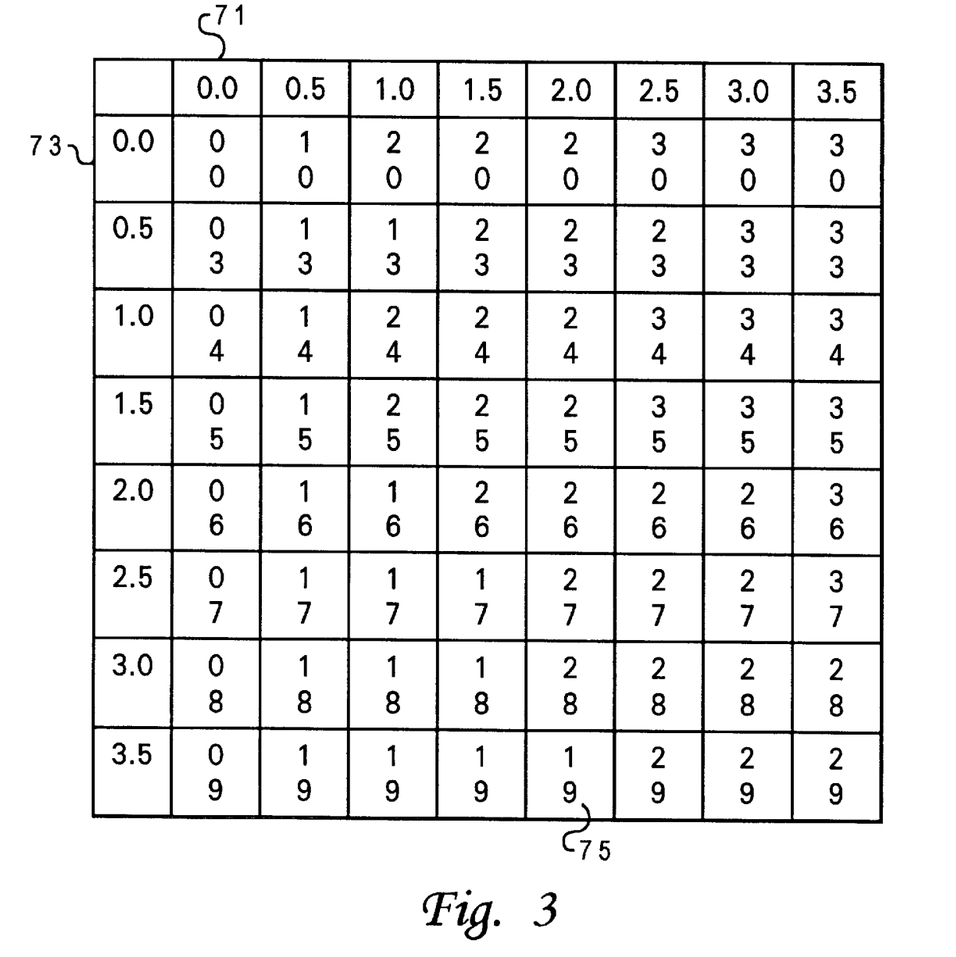
FIG. 3 illustrates a dual-technology provisioning table according to the present invention.

Referring to FIG. 3, there is shown an example of a provisioning generated according to the present invention for a particular desired grade of service. The column headings 71 represent dualmode traffic demand in Erlangs. Row headings 73 represent singlemode traffic demand, also in Erlangs. The table of FIG. 3 is populated, according to the method of the present invention, with numbers of digital and analog radios necessary to satisfy the desired grade of service criteria. The upper number in each box represent the number of digital radios, and the lower number represents the number of analog radios. Thus, if there are 2.0 Erlangs of dualmode traffic demand and 3.5 Erlangs of singlemode traffic demand, the specified grade of service criteria can be satisfied with one digital radio and nine analog radios, as indicated in box 75.

From the foregoing, it may be seen that the present invention overcomes the shortcomings of the prior art. The present invention provides optimal provisioning of analog and digital channels, taking into account dualmode overflow to analog channels, to achieve a desired overall grade of service.

The invention has been illustrated and described with respect to presently preferred embodiments. Those skilled in the art will recognized alternative embodiments, given the benefit of this disclosure. Accordingly, the foregoing description is intended for purposes of illustration and not of limitation.

What is claimed is:

1. A method for provisioning analog voice channels and digital voice channels in a wireless system, wherein said wireless system includes singlemode and dualmode mobile wireless units, said method comprising:

determining the number of analog voice channels necessary to produce a desired singlemode grade of service by $$\left(1 - e^{-E_a} \sum_{i=0}^{A-1} \frac{E_a^i}{i!}\right) + \sum_{j=0}^{A-1} \left(1 - e^{-E_d} \sum_{h=0}^{T+A-j-1} \frac{E_d^h}{h!}\right)\left(e^{-E_a} \frac{E_a^j}{j!}\right)$$

where
$E_a$ is the number of Analog-only Erlangs,
$E_d$ is the number of dualmode Erlangs,
T is the number of digital voice channels, and
A is the number of analog voice channels; and determining the number of digital voice channels necessary to produce a desired dualmode grade of service by $$\left(1 - e^{-E_d} \sum_{i=0}^{T-1} \frac{E_d^i}{i!}\right) + \sum_{j=0}^{A-1} \left(1 - e^{-E_a} \sum_{h=0}^{j} \frac{E_a^h}{h!}\right)\left(e^{-E_d} \frac{E_a^{T+A-j-1}}{(T+A-j-1)!}\right)$$

where
$E_a$ is the number of Analog-only Erlangs,
$E_d$ is the number of dualmode Erlangs,
T is the number of digital voice channels, and
A is the number of analog voice channels.

2. The method of claim 1, wherein said method further includes:
forming a provisioning table for the number of analog voice channels and digital voice channels necessary to produce said desired singlemode grade of service and dualmode grade of service.

3. A method for provisioning analog voice channels and digital voice channels in a wireless system, wherein said wireless system includes singlemode and dualmode mobile wireless units, said method comprising:

calculating singlemode grade of service by $$\left(1 - e^{-E_a} \sum_{i=0}^{A-1} \frac{E_a^i}{i!}\right) + \sum_{j=0}^{A-1} \left(1 - e^{-E_d} \sum_{h=0}^{T+A-j-1} \frac{E_d^h}{h!}\right)\left(e^{-E_a} \frac{E_a^j}{j!}\right)$$

where
$E_a$ is the number of Analog-only Erlangs,
$E_d$ is the number of dualmode Erlangs,
T is the number of digital voice channels, and
A is the number of analog voice channels.

4. The method of claim 3, wherein said method further includes
if said singlemode grade of service is greater than a specified grade of service criteria;
calculating an singlemode grade of service as a function of A+1 and T; and
calculating an singlemode grade of service as a function of A and T+1.

5. The method of claim 4, wherein said method further includes:
letting T equal T+1 if said analog grade of service as a function of A+1 and T is less than said analog grade of service as a function of A and T+1;
letting A equal A+1 if said analog grade of service as a function of A+1 and T is greater than said analog grade of service as a function of A and T+1; and
calculating analog grade of service as a function of A and T.

6. The method of claim 3, wherein said method further includes:
if said singlemode grade of service is less than a specified grade of service criteria, calculating a dual mode grade of service.

7. The method of claim 6, wherein said dualmode grade of service is calculated by $$\left(1 - e^{-E_d} \sum_{i=0}^{T-1} \frac{E_d^i}{i!}\right) + \sum_{j=0}^{A-1} \left(1 - e^{-E_a} \sum_{h=0}^{j} \frac{E_a^h}{h!}\right)\left(e^{-E_d} \frac{E_a^{T+A-j-1}}{(T+A-j-1)!}\right)$$

where
$E_a$ is the number of Analog-only Erlangs,
$E_d$ is the number of dualmode Erlangs,
T is the number of digital voice channels, and
A is the number of analog voice channels.

8. The method of claim 7, wherein said method further includes:
calculating average grade of service as a function of A and T; and
calculating average grade of service as a function of A−1 and T+1.

9. The method of claim 8, wherein said average grade of service is calculated according to the equation:

$$\frac{(DualmodeTraffic)(DualmodeGOS) + (SinglemodeTraffic)(SinglemodeGOS)}{(DualmodeTraffic + SinglemodeTraffic)}.$$

10. The method of claim 8, wherein said method further includes:
if the average grade of service as a function of A−1 and T+1 is less than the average grade of service as a function of A and T, and the average grade of service as a function of A−1 and T+1 is less than the specified grade of service criteria, setting T=T+1 and A=A−1.

11. The method of claim 8, wherein said method further includes:

if the average grade of service as a function of A−1 and T+1 is not less than the average grade of service as a function of A and T, and the average grade of service as a function of A−1 and T+1 is less than the specified grade of service criteria, provisioning T+1 digital voice channels and A−1 analog voice channels.

12. method of claim 8, wherein said method further includes:

if the average grade of service as a function of A−1 and T+1 is not less than the average grade of service as a function of A and T, or the average grade of service as a function of A−1 and T+1 is not less than the specified grade of service criteria, calculating average grade of service as a function of T−1 and A+1.

13. The method of claim 12, wherein said method further includes:

if the average grade of service as a function of A+1 and T−1 is less than the average grade of service as a function of A and T, and the average grade of service as a function of A+1 and T−1 is less than the specified grade of service criteria, setting T=T−1 and A=A+1.

14. The method of claim 12, wherein said method further includes:

if the average grade of service as a function of A+1 and T−1 is less than the average grade of service as a function of A and T, and the average grade of service as a function of A+1 and T−1 is less than the specified grade of service criteria, provisioning T−1 digital voice channels and A+1 analog voice channels.

15. The method of claim 12, wherein said method further includes:

if the average grade of service as a function of A+1 and T−1 is not less than the average grade of service as a function of A and T, or the average grade of service as a function of A+1 and T−1 is not less than the specified grade of service criteria, provisioning T digital voice channels and A analog voice channels.

* * * * *

UNITED STATES PATENT AND TRADEMARK OFFICE
CERTIFICATE OF CORRECTION

PATENT NO. : 6,647,275 B1
DATED : November 11, 2003
INVENTOR(S) : Kobernat It is certified that error appears in the above-identified patent and that said Letters Patent is hereby corrected as shown below:

Column 9,
Line 12, "12. method of claim 8" should read -- 12. The method of claim 8 --

Signed and Sealed this

Second Day of March, 2004

JON W. DUDAS
*Acting Director of the United States Patent and Trademark Office*